J. J. D. MEINCKE.
Forward Gear for Carriages.
No. 77,395.
Patented April 28, 1868.
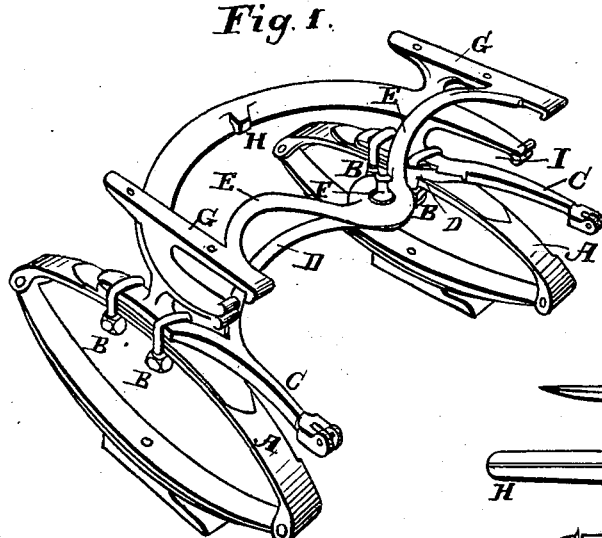
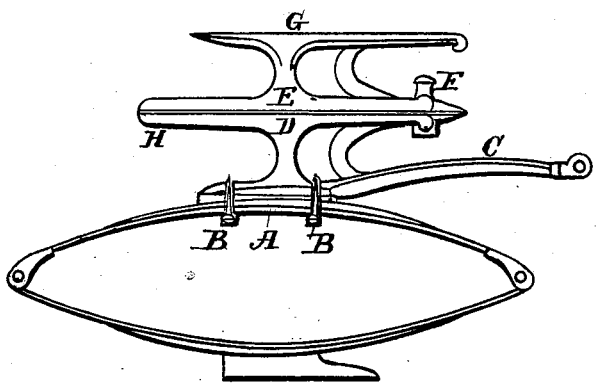
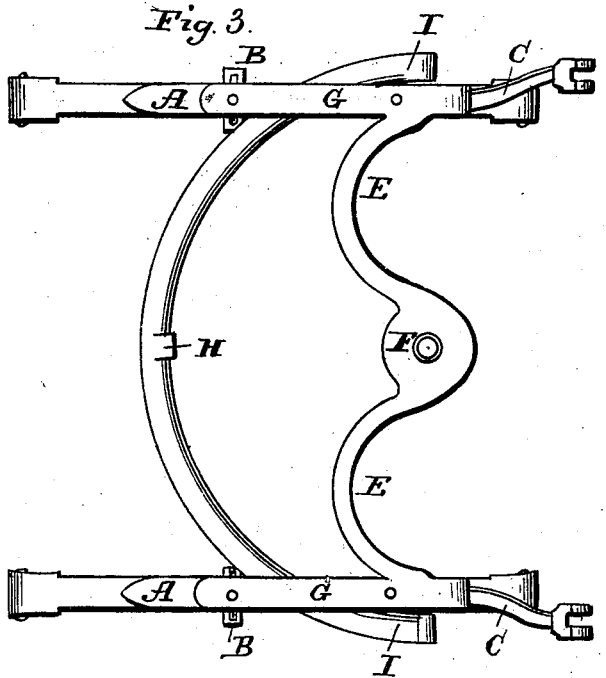

United States Patent Office.

JOHN J. D. MEINCKE, OF MILWAUKEE, WISCONSIN.

Letters Patent No. 77,395, dated April 28, 1868.

IMPROVEMENT IN FORWARD GEAR FOR CARRIAGES.

The Schedule referred to in these Letters Patent and making part of the same.

TO ALL WHOM IT MAY CONCERN:

Be it known that I, JOHN J. D. MEINCKE, of the city and county of Milwaukee, and State of Wisconsin, have invented a new and useful Improvement in Forward Gear for Carriages; and I do hereby declare that the following is a full, clear, and exact description thereof, which will enable those skilled in the art to make and use the same, reference being had to the accompanying drawing, forming part of this specification, in which—

Figure 1 is a perspective view.
Figure 2, a side view.
Figure 3, top view.

Similar letters of reference in each of the figures indicate corresponding parts.

The object of my invention is to produce a forward carriage-gear, made of metal, in two pieces only, of great strength, and, at the same time, light and symmetrical.

A, the springs, which rest on the forward axle of a carriage; B, clips, which fasten the gear to the springs; C C, draught-irons, to which the pole or shafts with which to draw the carriage are coupled; D, bottom-piece of the gear; E, top-piece of the gear; F, king-bolt; G G, rests for the forward part of a carriage-body; H, stop on the centre of the circular part of the top-piece E; I I, stops on the ends of the circular part of the bottom-piece D.

Operation.

The springs A being secured to the forward axle of a carriage, and the forward part of the body resting on the rests G G, and firmly secured to the same, the pole or shafts coupled to the draught-irons C C, then when the pole or shafts are turned in either direction, the upper part of the gear turns on the lower circle, and can be turned till the stop H comes in contact with one of the stops I, on the lower circle.

What I claim as my invention, and desire to secure by Letters Patent, is—

Draught-irons C C and bottom and top-pieces D and E, in combination with king-bolt F, substantially as described.

J. J. D. MEINCKE.

Witnesses:
    PERCY B. SMITH,
    J. B. SMITH.